United States Patent [19]

Hartway

[11] Patent Number: 5,094,424
[45] Date of Patent: Mar. 10, 1992

[54] BICYCLE SEAT POST SHOCK ABSORBER ASSEMBLY

[76] Inventor: James W. Hartway, 511 E. Irwin Ave., Littleton, Colo. 80122

[21] Appl. No.: 625,831

[22] Filed: Nov. 23, 1990

[51] Int. Cl.$^5$ .............................................. B62K 19/00
[52] U.S. Cl. .................................. 248/600; 280/220; 280/283
[58] Field of Search ................ 280/220, 283; 248/600, 248/601

[56] References Cited

FOREIGN PATENT DOCUMENTS

| 479084 | 3/1953 | Italy | 280/283 |
|---|---|---|---|
| 513843 | 2/1955 | Italy | 280/283 |
| 7612962 | 11/1976 | Netherlands | 280/220 |
| 12654 | of 1896 | United Kingdom | 280/283 |
| 5897 | of 1897 | United Kingdom | 280/283 |
| 16721 | of 1898 | United Kingdom | 280/283 |
| 23530 | of 1902 | United Kingdom | 280/283 |
| 387656 | 5/1931 | United Kingdom | 280/283 |

Primary Examiner—David L. Talbott
Attorney, Agent, or Firm—John E. Reilly

[57] ABSTRACT

A bicycle seat supporting device is of the type having a shock absorber mounted within an elongated tubular housing which telescopingly receives a lower end of a shaft opposite to the upper seat mounting portion, a roller bearing being positioned to engage a flat surface portion on the shaft to prevent relative rotation between the shaft and housing, and an adjustable locking member effectively renders the shock absorber unit inoperative by preventing longitudinal movement between the shaft and the housing member.

12 Claims, 1 Drawing Sheet

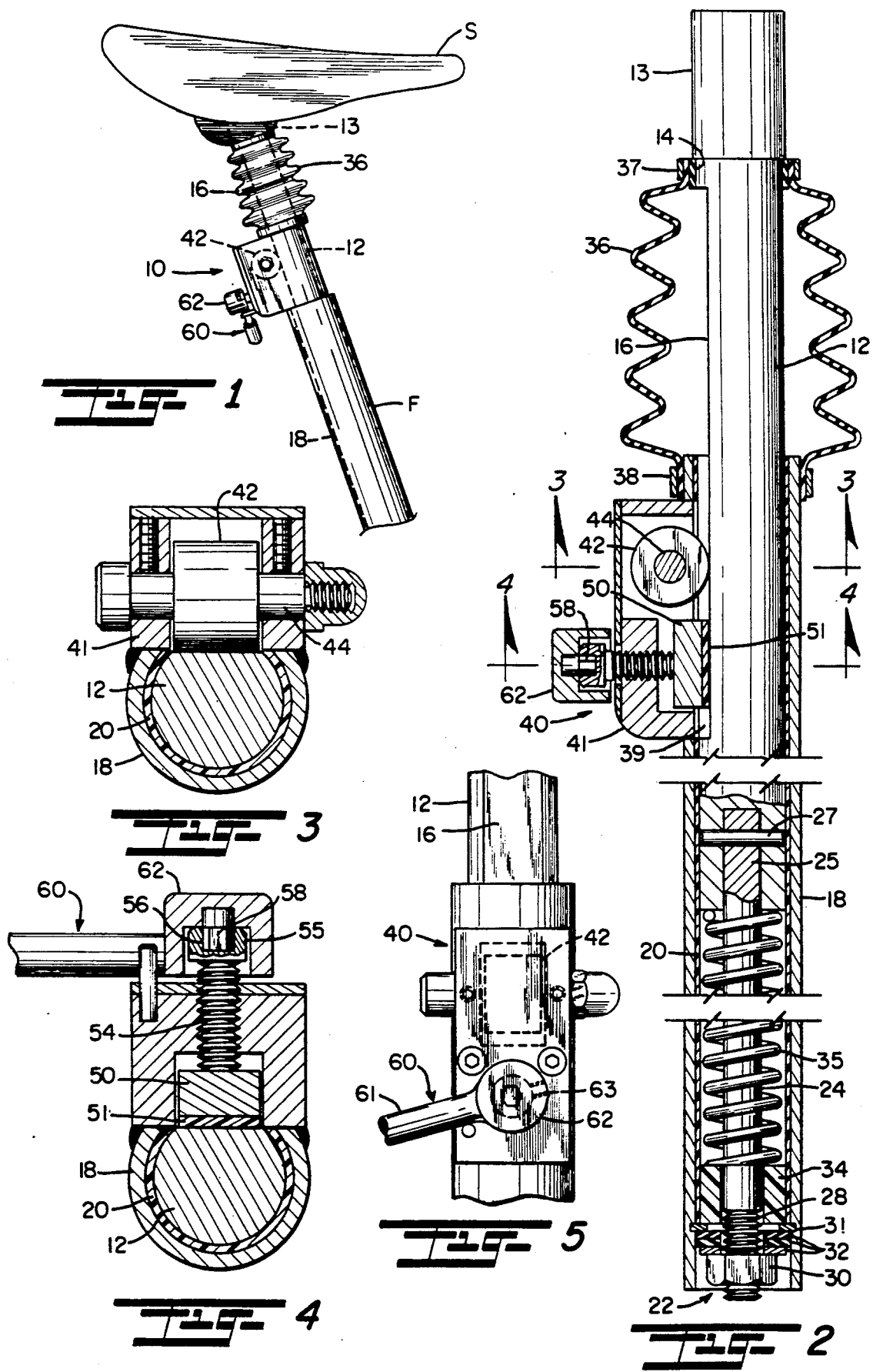

BICYCLE SEAT POST SHOCK ABSORBER ASSEMBLY

This invention relates to seat post assemblies for vehicles, such as, bicycles or motorcycles; and more particularly relates to a novel and improved seat post assembly of the type having a shock absorber which can be selectively locked out by the cyclist so as to be rendered inoperative.

BACKGROUND AND FIELD OF THE INVENTION

Numerous types of seat post supporting devices have been designed over the years to the end of increasing riding comfort for the bicycle rider. One of the more popular approaches has been to incorporate a shock absorber into a housing which receives the seat post so as to cushion any shocks. There are occasions when it is desirable to block out the shock absorber, for example, in pedaling uphill, or in mounting or dismounting. Moreover, it is desirable to be able to adjust the height between the telescoping seat post and housing member, and it is important that the cyclist be able to control the height of the seat as well as to selectively lock the shock absorber unit in and out without having to dismount. A particular problem encountered in the telescoping seat post assemblies now in use is that of effectively locking the seat and seat post against rotation with respect to the housing and for preventing the seat post from binding when the weight or load of the rider is applied. These problems have been previously addressed and representative of the approaches which have been taken in the past is the seat support assembly set forth and described in U.S. Pat. No. 4,182,508 to C. Kallai et al wherein a latch is utilized with a protrusion on one telescoping member which will fit into an aperture on the other telescoping member to prevent relative rotation therebetween. In U.S. Pat. No. 2,467,676 to R. A. Labine a supplemental spring suspension is employed although not for the express purpose of preventing rotation of the main seat post. In U.S. Pat. No. 4,421,357 To K. Shimano, the seat frame itself is designed in such a way as to discourage relative rotation between the seat post and saddle. Other representative patents are U.S. Pat. Nos. 4,502,727 to S. A. Holcomb et al; and 2,639,760 to F. Von Szilagyi.

There continues to be a need for a telescoping seat post assembly for cycles in which the telescoping members can be effectively locked against rotation with respect to one another and nevertheless facilitate vertical adjustment and not be subject to loosening under constant jarring or vibration. In this relation, it is highly desirable that a single locking member be provided both for height adjustment of the seat and selectively locking out the shock absorber; and further wherein the telescoping members are fixed against relative rotation, irrespective of whether the shock absorber is in use, while at the same time being freely telescoping or movable without binding.

SUMMARY OF THE INVENTION

Accordingly, it is an object of the present invention to provide for a novel and improved telescoping seat post assembly for cycles, particularly motorcycles and bicycles, which is highly dependable and effective in use.

It is another object of the present invention to provide for a novel and improved telescoping seat post assembly including a shock absorber unit associated with the assembly which can be selectively rendered inoperative when desired by the rider and wherein the assembly is capable of fixing the telescoping members against rotation irrespective of whether the shock absorber unit is in use.

It is a further object of the present invention to provide for a novel and improved telescoping seat post assembly for bicycles in which the telescoping members are not subject to relative rotation while being freely movable lengthwise with respect to one another.

An additional object of the present invention is to provide in a telescoping seat post assembly of the type having an inner telescoping shaft extending through an outer housing for a bearing member on the outer housing which is engageable with a flat bearing surface on the shaft in such a way as to prevent binding and to absorb a major part of the load; and the bearing member can be incorporated as a part of a locking unit to permit selective height adjustment of the bicycle seat.

In accordance with the present invention, a telescoping seat-supporting device for cycles, such as, motorcycles and bicycles has been devised and which comprises in combination an elongated shaft having an upper seat-mounting portion and a flat surface portion extending longitudinally along an exterior surface portion of the shaft beneath the seat-mounting portion, an elongated tubular housing member for telescopingly receiving an end of the shaft opposite to the seat-mounting portion, bearing means mounted on the housing member engageable with the flat surface portion whereby to prevent relative rotation between the shaft and the housing member while being free to roll freely in a lengthwise direction along the flat surface portion, and adjustable locking means between the shaft and the housing member for preventing relative longitudinal movement between the shaft and the housing member. In a preferred embodiment of the present invention, it is desirable to incorporate shock absorbing means in the housing member to yieldingly resist downward movement of the shaft relative to the housing member, and the adjustable locking means is operative to selectively lock out the shock absorbing means when the shaft is locked against relative longitudinal sliding movement with respect to the housing member.

The preferred form of bearing means is a roller bearing mounted in the housing member for rotation about an axis transverse to the longitudinal axis of the shaft which roller bearing will rollingly engage the flat surface portion on the shaft to fix the shaft against relative rotation with respect to the housing member and will absorb a substantial part of the load applied through the shaft while permitting it to advance freely in either longitudinal direction with respect to the housing member.

The above and other objects, advantages and features of the present invention will become more readily appreciated and understood from a consideration of the following detailed description when taken together with the accompanying drawings in which:

BRIEF DESCRIPTION OF THE DRAWINGS

FIG. 1 is a side view in elevation of a preferred form of telescoping seat post assembly in accordance with the present invention;

FIG. 2 is an enlarged longitudinal section view of the seat post assembly illustrated in FIG. 1;

FIG. 3 is a cross-sectional view taken about lines 3—3 of 2;

FIG. 4 is a cross-sectional view taken about lines 4—4 of FIG. 2; and

FIG. 5 is a plan view of the housing for a bearing member and locking device in accordance with the present invention.

DETAILED DESCRIPTION OF THE PREFERRED EMBODIMENT

Referring in more detail to the drawings, there is shown in FIGS. 1 to 5 a preferred form of seat post assembly 10 for a bicycle seat S. The assembly 10 is broadly comprised of an elongated shaft 12 having an upper seat-mounting portion in the form of an enlarged cylindrical end 13, a cushioning washer 14 located at the undersurface of the portion 13, and a flat milled surface portion 16 extends longitudinally along and is formed out of an exterior surface portion of the shaft 12. It should be noted that the surface portion 16 extends the greater length of the shaft but terminates short of lower cylindrical end 17 of the shaft. A seat post housing is in the form of a hollow cylindrical member or tube 18. The tube 18 includes a cylindrical liner 20 composed of a rugged low coefficient of friction material, such as, Nylon for close-fitting but slidable insertion of the shaft 16. In this regard, the shaft 16 is of a uniform external diameter, except for the flat surface portion 16, and the inner diameter of the liner 20 extends along the substantial length of the tube 18 but terminates just short of its lower end.

A shock absorber assembly is generally designated at 22 and comprises a guide rod 24 including an upper end portion 25 inserted in a counterbore at the lower end of the shaft 12 and affixed by a crosspin 27. The guide rod has a lower threaded end 28 for reception of a nut 30, flat metal washer 31 and a plurality of rubber cushioning washers as generally designated at 32. The washers 31 and 32 are interposed between the upper end of the nut 30 and a snap ring 33 inserted in an internal groove in the wall of the outer tube 18. A Nylon bushing 34 is interposed between the snap ring 33 and lower end of a coiled spring 35 which is disposed in surrounding relation to the guide rod and with the upper end of the spring 35 bearing against the lower end 17 of the shaft 12. In this relation, the coil spring is mounted under compression between the bushing 34 and lower end 17 so as to yieldingly resist any downward movement of the shaft 12 and seat S.

In accordance with conventional practice, a generally bellows-shaped, rubber boot 36 is disposed in surrounding relation to the upper end of the shaft 12, the upper extremity of the boot being clamped or otherwise secured to the washer 14 as indicated at 37 and the lower end being clamped as designated at 38 to the upper end of the tube 18. As shown in FIG. 1, the tube 18 may be mounted within a tubular frame member F of a bicycle and clamped in position in a conventional manner, not shown.

An important feature of the present invention resides in adjustable locking assembly 40 which is preferably disposed in a recess 39 which extends through the full thickness of the wall of the tube 18. The assembly 40 comprises an outer housing 41 in which is journaled a bearing member in the form of a roller bearing 42 journaled on a bearing axle 44. The axle 44 is removably inserted across the housing so as to extend transversely with respect to the longitudinal axis of the tube 18 and causes the bearing 42 to firmly engage the flat surface portion 16 of the shaft 12. In this way, the roller bearing 42 is free to roll in a longitudinal direction with respect to the shaft 16 but prevents relative rotation between the shaft 12 and the tube 18. The liner 20 has sufficient give that it will effectively preload the surface 16 of the shaft 12 against the roller bearing 42, although it will be appreciated that the bearing itself may be preloaded to assure that it exerts a constant pressure against the shaft 12.

In order to selectively lock the shaft 12 against longitudinal movement with respect to the tube 18, a brake pad 50 including an inner frictional brake lining 51 is disposed in the housing 41 to bear against the surface portion 16 directly beneath the roller bearing 42. The brake pad is selectively adjusted for radial movement toward and away from the surface portion 16 by a threaded stem 54 having an enlarged end portion 55 externally of the housing 41. The end 55 includes a hexagonal-shaped recess 56 which is engaged by locking lever 60 for threaded adjustment of the brake pad 50 toward and away from the surface portion 16. As shown in FIGS. 2, 4 and 5, the lever assembly 60 includes a lever arm 61 which terminates in an enlarged generally circular head 62 provided with a hollow interior which is adapted to be placed over the end portion or pin 56. A set screw 62 in a sidewall of the head 61 is provided for locking the head 61 against the end 56 and to prevent accidental removal. In addition, an internal pin 58 within the hollow interior of the head 61 is of hexagonal-shaped cross-section to conform to the cross-sectional size and configuration of the interior of the end 56 so that rotational movement of the lever arm 60 will cause corresponding movement of the threaded stem 54 in advancing the brake pad 50 toward and away from the surface portion 16.

The stem 54 is threaded such that clockwise rotation of the lever arm 60 will impart inward threaded movement of the brake pad against the surface portion to effectively lock the shaft 12 against longitudinal movement. For example, this is desirable in mounting or dismounting by exerting downward pressure on the seat against the upward urging of the spring 35 thereby lowering the seat and locking it in position either for the purpose of mounting or dismounting. In riding the bicycle, it may be desirable also to lock the seat against slidable movement, for example, in pedaling uphill. When the seat post and seat are locked out in this manner, the brake pad 50 will effectively cooperate with the roller bearing 42 in preventing any relative rotation between the shaft 12 and tubular housing 18.

Conversely, when the lever arm 61 is rotated in a counterclockwise or downward direction, it will be threaded outwardly to release the brake pad 50 from engagement with the surface portion 16 and permit the upper shaft to slide freely in a longitudinal direction with respect to the tube 18. The roller bearing 42 will continue to maintain pressure against the flat surface portion 16 thereby preventing relative rotation between the shaft 12 and the tube 18 and in this way effectively fix the seat S against rotation whether or not the shaft 12 is locked against longitudinal slidable movement. In a conventional manner, the boot 36 will effectively seal or encapsulate the shaft 12 with respect to the tube 18 to prevent entry of dirt or other foreign matter.

In the preferred form of invention as described, the housing 41 is of generally rectangular configuration and is formed as an integral part of the housing 18 by welding the outer walls of the housing to the correspondingly shaped surrounding edge of the recess 39 so that the innermost edge of the housing projects into the thickness of the tube 18 and stops outwardly of the inner liner portion 20 and above the enlarged lower end 17 of the shaft. For this reason, the bearing 42 is installed in the recess 39 after the shaft 12 has been inserted into the tube 18 and will limit upward sliding movement of the shaft 12 to the position shown in FIG. 2. In the alternative, it will be appreciated that the lever arm assembly 40 may be a self-contained unit including a sleeve member which would be affixed to the upper end of the tube 18 so that it can be retrofit for existing bicycle seat post assemblies. In other words, the housing 40 could be inserted over the upper end of the tube and held or locked in place by set screws or other suitable attaching means and avoid the need for the recess 39 in the tube 18.

It will be further evident from the description of the preferred form of invention that more than one bearing member may be employed to work in cooperation with flat surface portions at opposite sides of the shaft 12 in fixing the shaft 12 against rotation with respect to the tube 18. Still further, it will be evident that the bearing member 42 as described may be used either with or without a shock absorber assembly in order to prevent the rotation of the seat S with respect to the tube 18. As illustrated in FIG. 1, the frame F of the bicycle which receives the housing member 18 typically inclines in an upward rearward direction so that the weight of the rider when seated on the bicycle is applied downwardly and somewhat vertically against the rearward surface of the housing 18 and frame F. It is therefore important that the roller bearing 42 be oriented along the rearward inclined surface of the housing so as to absorb a greater part of the load as applied downwardly through the rearward flat surface of the shaft 12. This will also greatly minimize any tendency of the shaft to bind against the inner surface of the tube 18.

It is therefore to be understood that various modifications and changes may be made in the construction and arrangement of elements comprising the preferred form of invention as set forth without departing from the scope of the invention as defined by the appended claims.

I claim:

1. A bicycle seat-supporting device comprising:
    an elongated shaft having an upper seat-mounting portion and a flat surface portion extending along an exterior surface lengthwise of said shaft beneath said seat-mounting portion;
    an elongated tubular housing member to telescopingly receive an end of said shaft opposite to said seat-mounting portion;
    bearing means mounted on said housing member to engage said flat surface portion whereby to prevent relative rotation between said shaft and said housing member while permitting said shaft to move longitudinally with respect to said housing member;
    shock absorbing means in said housing member to yieldingly resist downward movement of said shaft relative to said housing member; and
    adjustable locking means on said housing member for releasably engaging said shaft to prevent relative longitudinal sliding movement between said shaft and said housing member independently of the engagement between said bearing means and said flat surface portion.

2. A device according to claim 1, said bearing means including a roller bearing member mounted for rotation about an axis transverse to the longitudinal axis of said shaft.

3. A device according to claim 1, said bearing means and said locking means disposed in axially spaced relation to one another in a recessed portion of said housing.

4. A device according to claim 1, said locking means releasably but clampingly engaging said shaft whereby to vertically adjust said seat.

5. A device according to claim 1, said locking means disposed in a recessed portion in a sidewall of said housing and including a brake pad in facing relation to said flat surface portion, and threaded adjustment means for urging said brake pad into frictional engagement with said flat surface portion.

6. A seat-supporting device for a bicycle or motorcycle comprising:
    an elongated shaft having an upper seat-mounting portion and a flat surface portion extending along an exterior surface lengthwise of said shaft beneath said seat-mounting portion;
    an elongated tubular housing member to telescopingly receive an end of said shaft opposite to said seat-mounting portion;
    bearing means in the form of a roller bearing mounted in fixed relation to said housing member in rollable engagement with said flat surface portion whereby to prevent relative rotation between said shaft and said housing member; and
    adjustable locking means on said housing member for releasably engaging said shaft to prevent relative longitudinal movement between said shaft and said housing member.

7. A device according to claim 6, wherein said housing member extends in an upward rearward direction, and said roller bearing is mounted on a rearward inclined surface portion of said housing for rotation about an axis transverse to the longitudinal axis of said shaft.

8. A device according to claim 6, said roller bearing means and said locking means disposed in axially spaced relation to one another in a recessed portion of said housing member.

9. A device according to claim 6, said locking means releasably but clampingly engaging said shaft whereby to vertically adjust said seat.

10. A device according to claim 6, said locking means disposed in a recessed portion in a sidewall of said housing member and including a brake pad in facing relation to said flat surface portion, and threaded adjustment means for urging said brake pad into frictional engagement with said flat surface portion.

11. A device according to claim 10, said threaded adjustment means including a lever arm for manually rotating said threaded adjustment means and an end stop in the path of said lever arm to limit tightening of said treated adjustment means.

12. A device according to claim 11, said threaded adjustment means including a threaded stem having an enlarged head, in said lever arm including a cap and having means releasably connecting said cap to said enlarged head of said stem.

* * * * *